United States Patent [19]

Wilson et al.

[11] 4,242,396

[45] Dec. 30, 1980

[54] FILMS OF THERMOPLASTICS MATERIALS HAVING ROUGHENED SURFACES

[75] Inventors: John R. Wilson, Knebworth; Terence I. Worbey, Hitchin, both of England

[73] Assignee: Imperial Chemical Industries Limited, London, England

[21] Appl. No.: 862,297

[22] Filed: Dec. 19, 1977

[30] Foreign Application Priority Data

Oct. 20, 1977 [GB] United Kingdom ............... 43707/77

[51] Int. Cl.$^{2}$ ........................... B32B 3/30; B32B 5/22

[52] U.S. Cl. ...................................... 428/141; 434/85; 106/32.5; 427/256; 427/393.5; 427/407.1; 428/323; 428/329; 428/330; 428/331; 428/332; 428/341; 428/143; 428/480; 428/515; 428/910

[58] Field of Search ............... 428/141, 147, 143, 149, 428/323, 325, 331, 515, 406, 407, 329, 910, 480, 341; 427/203, 222, 407 R, 372, 256; 106/32.5; 35/66

[56] References Cited

U.S. PATENT DOCUMENTS

| | | | |
|---|---|---|---|
| 3,154,461 | 10/1964 | Johnson | 428/323 |
| 3,531,312 | 9/1970 | Newman | 428/330 |
| 3,790,435 | 2/1974 | Tanbe et al. | 428/328 |
| 3,839,253 | 10/1974 | Kershaw et al. | 428/328 |

FOREIGN PATENT DOCUMENTS

| | | |
|---|---|---|
| 1096064 | 12/1967 | United Kingdom . |
| 1240586 | 7/1971 | United Kingdom . |
| 1264338 | 2/1972 | United Kingdom . |
| 1443757 | 7/1976 | United Kingdom . |

*Primary Examiner*—Paul J. Thibodeau

*Attorney, Agent, or Firm*—Cushman, Darby & Cushman

[57] ABSTRACT

Thermoplastics films suitable for use as drafting materials comprise a filled film or a film composite having a filled layer, the fillers having a nominal particle size in the range 4 to 15 μm and providing a roughened surface, and a matt layer adherent to the roughened surface comprising a binding resin and secondary filler particles having a nominal particle size in the range 1 to 15 μm in an amount 10 to 100% by weight and having a coat weight of 0.05 to 2.0 g/m$^2$. Also relates to a process for producing the films.

23 Claims, No Drawings

FILMS OF THERMOPLASTICS MATERIALS HAVING ROUGHENED SURFACES

The present invention relates to films suitable for use as drafting materials which comprise thermoplastics materials having roughened surfaces.

It is known to add filler particles of inert inorganic materials to thermoplastics films intended for use as drafting materials. The filler particles roughen the film surface rendering it receptive to marking with drafting instruments, such as pencils. Drafting materials of this nature prepared from polyethylene terephthalate films are disclosed in United States Pat. No. 3,154,461.

Although the roughening of the film surface by the filler particles reduces the inherent gloss of the thermoplastics material, it has been found that there can be sufficient residual surface gloss to reflect light and introduce visual difficulties in the use of the film as a drafting material. The ink-take properties of such films are also often poor.

According to the present invention a thermoplastics film suitable for use as a drafting material comprises a self-supporting film of a thermoplastics material, at least one surface of said film being roughened by filler particles included in the thermoplastics material adjacent the surface, said filler particles having a nominal particle size in the range 4 to 15 μm, and a matt layer adherent to the roughened surface comprising a binding resin and secondary filler particles having a nominal particle size in the range 1 to 15 μm in an amount in the range 10 to 100% by weight based upon the weight of the binding resin, said matt layer having a coat weight in the range 0.05 to 2.0 g/m$^2$.

The invention is also concerned with a process for the production of a thermoplastics film suitable for use as a drafting material which comprises applying a matt layer to a self-supporting film of a thermoplastics material, at least one surface of said film being roughened by filler particles included in the thermoplastics material adjacent the surface, said filler particles having a nominal particle size in the range 4 to 15 μm, the matt layer being applied to the roughened surface from a coating composition comprising a binding resin and secondary filler particles having a nominal particle size in the range 1 to 15 μm in an amount in the range 10 to 100% by weight based upon the weight of the binding resin, and drying the matt layer to a coat weight in the range 0.05 to 2.0 g/m$^2$.

The matt layer has low surface gloss in combination with excellent abrasive properties rendering the material susceptible to marking with drafting instruments such as pencils.

The term "nominal particle size" used herein relates to that size of particle in the self-supporting thermoplastics film or matt layer, determined as the size of the particle in its greatest dimension, for which 50% by number of the particles in the particulate material have a size equal to and less than that size. Particle sizes may be measured by electron microscope, Coulter counter or sedimentation analysis and the nominal particle size determined by plotting a cumulative distribution curve representing the percentage of particles equal to or smaller than a number of predetermined particle sizes.

The self-supporting thermoplastics film may consist of any suitable material, such as polystyrene, polyamides, polymers and copolymers of vinyl chloride, polycarbonate, polymers and copolymers of olefines, e.g. polyethylene and polypropylene, polysulphones and linear polyesters which may be obtained by condensing one or more dicarboxylic acids or their lower alkyl diesters, e.g. terephthalic acid, isophthalic, phthalic, 2,5-, 2,6- and 2,7-naphthalene dicarboxylic acid, succinic acid, sebacic acid, adipic acid, azelaic acid, diphenyl dicarboxylic acid, and hexahydroterephthalic acid or bis-p-carboxyl phenoxy ethane, optionally with a monocarboxylic acid, such as pivalic acid, with one or more glycols, e.g. ethylene glycol, 1,3-propanediol, 1,4-butanediol, neopentyl glycol and 1,4-cyclohexanedimethanol.

The self-supporting film may consist of a film composite comprising a multiplicity of layers of the same or different thermoplastics material in which one or more of the outer layers is roughened by the inclusion of filler particles. Alternatively, the film may consist of a single layer comprising filler particles distributed throughout the film thickness.

The self-supporting film is preferably biaxially oriented and, if appropriate, heat set. Biaxially oriented and heat set films of polyethylene terephthalate are particularly useful as the self-supporting film.

The roughened surface of the self-supporting film may be achieved by the inclusion of any suitable filler particle which is chemically inert towards the thermoplastics material from which the film is produced and may be an inorganic or a thermoplastics particulate filler. Suitable inorganic fillers may be chosen from silica, especially precipitated or diatomaceous silica and silica gels, calcined china clay, calcium carbonate and aluminium trihydrate. Silica particles are particularly preferred.

Preferably the filler particles included in the self-supporting film have a nominal particle size in the range 5 to 10 μm. Particularly preferred particles include diatomaceous silica particles having a nominal particle size of about 6 μm especially particles in which the size distribution is such that 98% of the particles have a size in the range 1 to 40 μm and 80% of the particles are less than 10 μm in size, and an amorphous silica gel having a nominal particle size of about 9 μm.

The secondary filler particles included in the matt layer may be chosen from those materials mentioned above for inclusion in the self-supporting film, of which silica particles are preferred, and may comprise the same or different material as the particles in the self-supporting film. Preferably the secondary filler particles have a nominal particle size in the range 2 to 8 μm, and most preferably 2 to 5 μm since the smaller particles have a greater effect in reducing surface gloss. Especially preferred secondary filler particles comprise precipitated silica particles having a nominal particle size of about 3 μm wherein about 50% of the particles have a size in the range 1 to 2 μm and the maximum particle size present is about 6 μm. Alternative secondary filler particles comprise diatomaceous silica particles having a nominal particle size of about 4 μm wherein the particles have a particle size in the range 1 to 10 μm.

Especially effective properties are achieved when the secondary filler particles comprise from 30 to 65%, and preferably about 50%, by weight of the matt layer based upon the weight of the binding resin.

The binding resin of the matt layer may be chosen from any suitable resin which is sufficiently adherent to the roughened surface of the self-supporting film that its adhesion is not weakened or destroyed by the abrasive effect of drafting instruments drawn across its surface.

It is also desirable that the binding resin should be inherently susceptible to marking with ink, although ink-receptive additives may be added to the coating composition to improve the inherent ink-take properties of the binding resin or confer such properties upon it. Particularly effective binding resins may be chosen from copolymers of vinylidene chloride especially such copolymers with acrylonitrile, cellulosic esters and copolymers of acrylic acid and methacrylic acid and glycidyl and lower alkyl (up to six carbon atoms) esters of such acids, especially such acrylic and methacrylic copolymers that are capable of external or internal cross-linking, such as those containing cross-linkable functional groups, e.g. hydroxyl, carboxyl, amide, oxirane, amine, nitrile, epoxy and trihydroxy silyl groups. Cross-linking of such acrylic and methacrylic binding copolymers may be achieved by means of a crosslinking resin which may comprise an epoxy resin, an alkyd resin or a condensation product of an amine, e.g. melamine, diazine, urea, thiourea, alkyl melamines, aryl melamines, guanamines, benzo guanamines, alkyl guanamines and aryl guanamines, with an aldehyde, e.g. formaldehyde, which may optionally be alkoxylated. A preferred cross-linking resin is the condensate of melamine and formaldehyde. The cross-linking of acrylic and methacrylic copolymers may be enhanced by the addition to the composition from which the matt layer is applied to the roughened surface of the self-supporting film of a catalyst such as ammonium chloride, ammonium nitrate, ammonium thiocyanate, ammonium dihydrogen phosphate, diammonium hydrogen phosphate, para toluene sulphonic acid, sulphuric acid, maleic acid stabilised by reaction with a base or morpholinium para toluene sulphonate.

A particularly preferred binding resin comprises a copolymer of 40 to 60 mole % of ethyl acrylate, 40 to 60 mole % of methyl methacrylate and 1 to 20 mole % of one or more other ethylenically unsaturated comonomers copolymerisable therewith such as acrylamide or methacrylamide. An especially preferred binding resin which provides good adhesion to the self-supporting film together with ink-take properties comprises a copolymer of 48 mole % ethyl acrylate, 48 mole % methyl methacrylate and 4 mole % acrylamide cross-linked by means of an ethylated condensate of melamine and formaldehyde.

The matt layer should be applied uniformly over the roughened surface of the self-supporting film and should have a coat weight of at least 0.05 $g/m^2$, smaller coat weights exhibit poor adhesion to the film surface and have poor durability, particularly upon erasure. Coat weights exceeding 2.0 $g/m^2$ have poor drafting properties since the roughness of the underlying film surface which contributes to the drafting properties of the material tends to be masked by the thick matt layer. The matt layer preferably has a coat weight in the range 0.08 to 1.0 $g/m^2$ and most preferably 0.3 to 0.5 $g/m^2$ and provides a particularly satisfactory combination of mattness and drafting properties.

The matt layer may be applied to the self-supporting film from a coating composition comprising an organic solvent or aqueous medium. The preferred binding resins comprising cross-linkable acrylic or methacrylic copolymers may be applied as aqueous latices.

The coating compositions may be applied to the surface of the film by any suitable known film coating technique and dried, preferably by heating to a temperature exceeding 70° C. and up to a maximum temperature determined by the nature of the plastics film employed. Heating serves to drive off the aqueous medium and also, when appropriate, to facilitate the cross-linking of crosslinkable binding resins.

When the support film is an oriented film, e.g. a biaxially oriented film of polyethylene terephthalate, the coating composition may be applied to the support film before, during or after the stretching operations employed in continuous film production processes to orient the film. A convenient procedure is to coat the support film between the two stretching operations which are applied in mutually perpendicular directions to orient the film, e.g. the film is stretched longitudinally, coated and stretched transversely.

Some binding resins, especially the cross-linkable acrylic and methacrylic copolymers described above, may be coated with excellent adhesion by lacquers which are commonly used in the graphic arts field, e.g. cellulose esters which may contain or be impregnated with diazo salts.

The present invention is further illustrated by the following Examples.

EXAMPLE 1 AND COMPARATIVE EXAMPLES 1 AND 2

A matt coating composition was prepared from the following ingredients:

| | |
|---|---|
| Cross-linkable binding resin comprising 80% by weight of copolymer of 48 mole % ethyl acrylate, 48 mole % of methyl methacrylate and 4 mole % acrylamide and 20% by weight of an ethylated condensate of melamine and formaldehyde | 130 g |
| Diatomaceous silica particles having a nominal particle size of about 4 μm wherein the particles have a particle size in the range 1 to 10 μm | 72 g |
| Ink-receptive additive, acrylic resin available commercially as 1270T from Allied Colloids Ltd | 48 g |
| Distilled water | 600 ml |

The coating composition was applied in Example 1 and Comparative Example 1 to self-supporting films of polyethylene terephthalate during the stretching operation employed to orient them by the following sequence of process steps. The polyethylene terephthalate films were melt extruded and quenched to the amorphous state on a cooled rotating drum. The resulting films were stretched in the direction of extrusion to about 3.0 times their original length and then coated on one side with the above coating composition by a roller coating technique and passed into a stenter oven where the coating was dried. The dried coated films were then stretched sideways about 3.0 times their original width and finally heat set at a temperature of about 220° C. The final coat weight of the matt layer was 0.6 $g/m^2$ and the total thickness of the coated films was about 50 microns.

The self-supporting polyethylene terephthalate film employed in Example 1 included 2.4% by weight based upon the weight of polyethylene terephthalate of diatomaceous silica particles having a nominal particle size of 6 μm in which the particle size distribution is such that 98% of the particles have a size in the range 1 to 40 μm and 80% of the particles are less than 10 μm in size, the particles being uniformly distributed throughout the film.

The self-supporting polyethylene terephthalate film employed in Comparative Example 1 included 0.17% by weight based upon the weight of polyethylene terephthalate of precipitated silica particles having a nominal particle size of 3 μm wherein about 50% of the particles have a size in the range 1 to 2 μm and the maximum particle size is about 6 μm, the particles being uniformly distributed throughout the film.

The properties of the matt coated films are shown in the Table together with the properties of the uncoated film used as the support in Example 1.

The pencil-receptive properties of the films were assessed by drawing pencil lines on to the matt layer of the film of Example 1 and Comparative Example 1 and the matt surface of the uncoated film of Comparative Example 2 with pencils of differing hardnesses ranging from B to 5H and all sharpened to similar points and applied under the same pressure during drawing. The films were supported upon a hard non-resilient surface for marking. The hardest pencil which smudges was assessed by rubbing with a slightly moist finger the pencil line drawn with each hardness of pencil and noting the hardest pencil grade which smudged as a result of rubbing (the next hardest pencil grade being resistant to smudging). The softest pencil which scratches the matt layer was assessed by determining the softest pencil which cut into the matt layer or film surface (the next softest pencil grade having no such influence upon the matt layer or film surface).

Specular Gloss was determined by the ASTM-D2457-70 test using a Gardner PG 5500 digital photometric apparatus against gloss tiles as a reference standard and making the determinations at 45°.

The results recorded in the Table illustrate that the matt coated film of Example 1 had improved pencil-receptive properties in relation to the films of the Comparative Examples since a wider range of pencil hardnesses may be employed without smudging and scratching. The matt layer applied to the film of Example 1 exhibited visually improved drafting properties such as pencil line quality, pencil erase and redraw properties and ink-receptivity.

TABLE 1

| | Example 1 | Comparative Example 1 | Comparative Example 2 |
|---|---|---|---|
| Hardest pencil which smudges | HB | H | 2H |
| Softest pencil which scratches the matt layer | 3H | 2H | 2H |
| Specular Gloss (45°) | 4.8 | 9.6 | 28.0 |

We claim:

1. A thermoplastics film suitable for use as a drafting material, which comprises a self-supporting film of a thermoplastics material, at least one surface of said film being roughened by filler particles included in the thermoplastics material adjacent the surface, said filler particles having a nominal particle size in the range 4 to 15 μm, and a matt layer adherent to but not masking the roughened surface comprising a binding resin and secondary filler particles having a nominal particle size in the range 1 to 15 μm in an amount in the range 10 to 100% by weight based upon the weight of the binding resin, said matt layer having a coat weight in the range 0.05 to 2.0 g/m$^2$.

2. A film according to claim 1, in which the self-supporting film comprises a multiplicity of layers of the same or different thermoplastics material in which at least one of the outer layers is roughened by the inclusion of filler particles.

3. A film according to claim 1, in which the self-supporting film is a biaxially oriented and heat-set film of polyethylene terephthalate.

4. A film according to claim 1, in which the filler particles used to roughen the surface of the self-supporting film comprise silica, calcined china clay, calcium carbonate or aluminium trihydrate.

5. A film according to claim 1, in which the filler particles used to roughen the surface of the self-supporting film have a nominal particle size in the range 5 to 10 μm.

6. A film according to claim 1, in which the secondary filler particles have a nominal particle size in the range 2 to 5 μm.

7. A film according to claim 1, in which the secondary filler particles comprise from 30 to 65% by weight of the matt layer based upon the weight of the binding resin.

8. A film according to claim 1, in which the binding resin of the matt layer comprises a copolymer of acrylic acid, methacrylic acid, or a glycidyl or lower alkyl ester of such acids.

9. A film according to claim 8, in which the binding resin comprises a copolymer of 40 to 60 mole % of ethyl acrylate, 40 to 60 mole % of methyl methacrylate and 1 to 20 mole % of one or more other ethylenically unsaturated comonomers copolymerisable therewith.

10. A film according to claim 9, in which the binding resin comprises a copolymer of 48 mole % ethyl acrylate, 48 mole % methyl methacrylate and 4 mole % acrylamide cross-linked by means of an ethylated condensate of melamine and formaldehyde.

11. A film according to claim 1, in which the matt layer has a coat weight in the range 0.05 to 2.0 g/m$^2$.

12. A process for the production of a thermoplastics film suitable for use as a drafting material, which comprises applying a matt layer to a self-supporting film of a thermoplastics material, at least one surface of said film being roughened by filler particles included in the thermoplastics material adjacent the surface, said filler particles having a nominal particle size in the range 4 to 15 μm, the matt layer being applied to but not masking the roughened surface from a coating composition comprising a binding resin and secondary filler particles having a nominal particle size in the range 1 to 15 μm in an amount in the range 10 to 100% by weight based upon the weight of the binding resin, and drying the matt layer to a coat weight in the range 0.05 to 2.0 g/m$^2$.

13. A process according to claim 12, in which the self-supporting film is biaxially oriented and the matt layer is applied to the surface of the film between the two stretching operations employed to orient the film.

14. A process according to claim 12, in which the self-supporting film comprises a multiplicity of layers of the same or different thermoplastics material in which at least one of the outer layers is roughened by the inclusion of filler particles.

15. A process according to claim 12, in which the self-supporting film is a biaxially oriented and heat-set film of polyethylene terephthalate.

16. A process according to claim 12, in which the filler particles used to roughen the surface of the self-supporting film comprise silica, calcined china clay, calcium carbonate or aluminium trihydrate.

17. A process according to claim 12, in which the filler particles used to roughen the surface of the self-supporting film have a nominal particle size in the range 5 to 10 μm.

18. A process according to claim 12, in which the secondary filler particles have a nominal particle size in the range 2 to 5 μm.

19. A process according to claim 12, in which the secondary filler particles comprise from 30 to 65% by weight of the matt layer based upon the weight of the binding resin.

20. A process according to claim 12, in which the binding resin of the matt layer comprises a copolymer of acrylic acid, methacrylic acid, or a glycidyl or lower alkyl ester of such acids.

21. A process according to claim 20, in which the binding resin comprises a copolymer of 40 to 60 mole % of ethyl acrylate, 40 to 60 mole % of methyl methacrylate and 1 to 20 mole % of one or more other ethylenically unsaturated comonomers copolymerisable therewith.

22. A process according to claim 21, in which the binding resin comprises a copolymer of 48 mole % ethyl acrylate, 48 mole % methyl methacrylate and 4 mole % acrylamide cross-linked by means of an ethylated condensate of melamine and formaldehyde.

23. A process according to claim 12, in which the matt layer has a coat weight in the range 0.05 to 2.0 $g/m^2$.

* * * * *